INVENTOR.
Charles H. Muehlhausen
BY
Paul J. Rose Jr.
Atty.

United States Patent Office 3,086,345
Patented Apr. 23, 1963

3,086,345
LIFT MECHANISM FOR MOWERS
Charles H. Muehlhausen, Shelbyville, Ill., assignor, by mesne assignments, to The Oliver Corporation, Chicago, Ill., a corporation of Delaware
Filed Mar. 17, 1960, Ser. No. 15,666
3 Claims. (Cl. 56—25)

This invention relates generally to tractor mounted mowers and more particularly to a lift mechanism for rear mounted mowers.

It has been found that the lift provided by the lift arms of a tractor in many cases, does not give sufficient clearance of the mower over objects in a field. Various devices and arrangements have been provided to furnish lift to the mower cutter bar in addition to that provided by the tractor lift arms, but such devices have been expensive and complicated and not wholly sufficient.

It is therefore an object of the invention to provide an improved lift mechanism for a mower.

A further object of the invention is to provide an improved cutter bar lift for tractor-mounted mowers which automatically lifts the outer end of the cutter bar upon lifting of the mower by the lift arms of the tractor.

These and other objects of the invention will appear from time to time as the following specification proceeds and with reference to the accompanying drawings, wherein:

FIGURE 1 is a fragmentary side elevational view, with parts broken away, showing a portion of the linkages of the lift mechanism in normal operating position.

Figure 1:
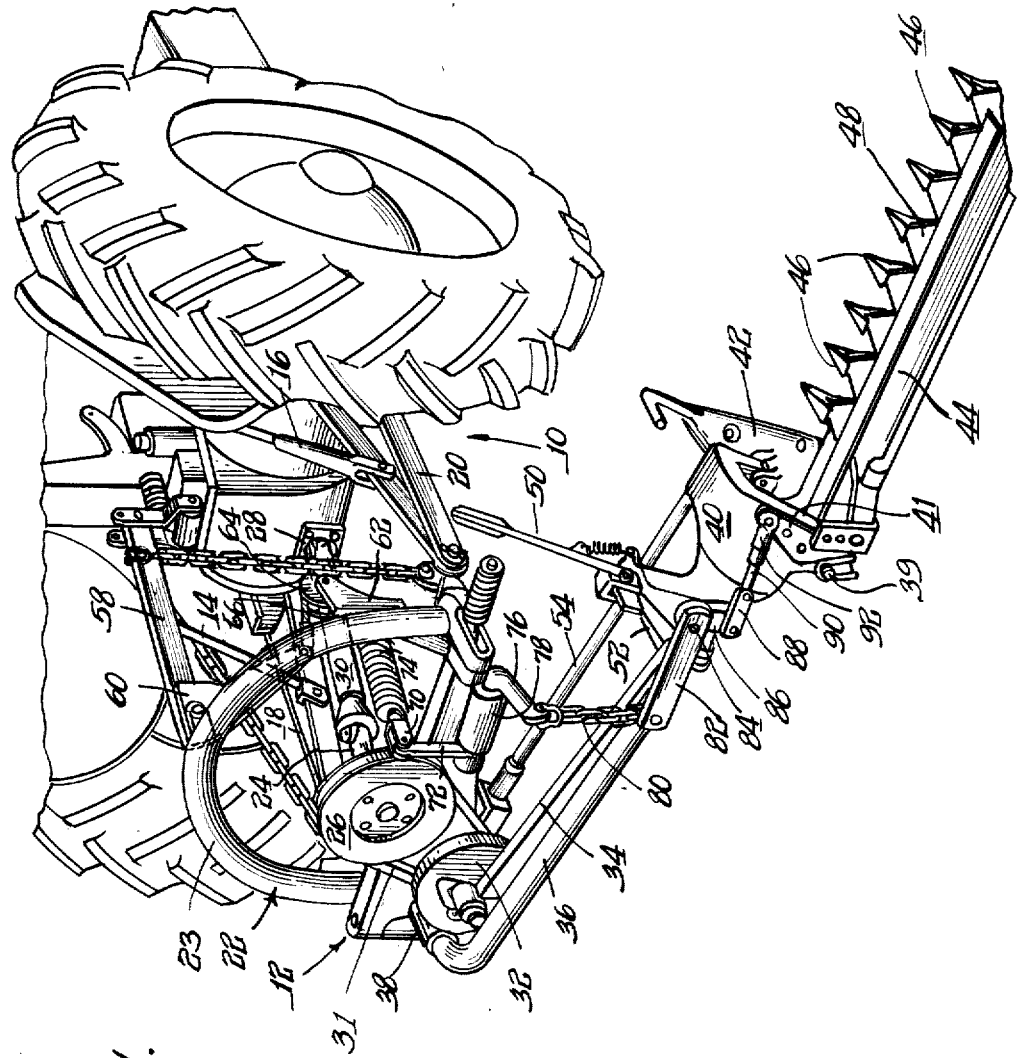
FIGURE 1 is a perspective view of the rear of a tractor having mounted thereon a mower embodying my improved lift mechanism.

In FIGURE 1, the rear of a tractor is generally indicated by numeral 10, and a mower including the lift mechanism of my invention is generally indicated by numeral 12. The tractor 10 includes a pair of power operated lift arms (not shown) operatively connected to a pair of lift links 14, 16, which in turn are operatively connected to a pair of draft links 18, 20. The draft links are each formed of two elongated members having inner ends spaced apart and pivotally connected to the axle carrier of the tractor 10 and outer ends joined together for attachment to a frame structure 22 of the mower 12, which structure is characterized by an inverted U-shaped frame member 23.

A shaft 24 for a drive pulley 26 is rotatably received in suitable bearings (not shown) mounted on frame structure 22 with the shaft 24 being operatively connected to power-take-off shaft 28 of the tractor 10 through an intermediate shaft 30 and suitable universal joints. The pulley 26 is connected by a V-belt 31 to a crank wheel 32 on which a pitman 34 is mounted.

A transverse drag bar 36 is provided with a ninety degree bend adjacent one end thereof which is pivotally mounted in an integral boss 38 on a portion of frame structure 22. A yoke 40 is secured to the other end of drag bar 36, and on yoke 40 is pivotally mounted the usual inner shoe 42 carrying a cutter bar 44 and guards 46. The cutter bar 44 carries a reciprocating sickle 48 which is operatively connected to pitman 34 within the yoke 40. The yoke 40 is angularly adjustable on drag bar 36 by means of a handle 50 mounted thereon and securable in different positions with respect to the top edge of a plate 52 rigidly secured to drag bar 36. A stabilizing rod 54 is pivotally connected to frame structure 22 at one end with its opposite end being slidably connected in a well-known manner (not shown) at yoke 40, the slidable connection being necessary since rod 54 and drag bar 36 pivot on different centers.

The improved lift mechanism of my invention will now be described. The upper portion of frame member 23 has welded thereto a double bracket or clevis 56, best shown in FIGURES 3 and 4. Pivotally connected at one end to clevis 56 is an upper link 58, the third link of a three point hitch and a part of the mower. The other end of upper link 58 is pivotally connected to the frame of tractor 10. The upper link 58 includes a bent or curved arm 60 forming a cable actuating means, as will be presently described. The arm 60 is rigidly secured to the end of upper link 58 mounted in clevis 56 and is bent or curved to extend downward to the right, as can be seen in FIGURE 1.

A bracket 62 (FIGURES 3 and 4) is secured to an extension of frame structure 22 and has a pulley 64 mounted therein. The pulley 64 cooperates with a cable 66 mounted thereon and secured at one end to a clevis 68 and at the other end to a clevis 70. Clevis 68 is pivotally connected to arm 60, and clevis 70 is pivotally connected to an arm 72 of a bell crank lever. The other arm 76 of the bell crank lever is formed of a bent rod having one end supported in a sleeve bearing 78 on frame structure 22 (see FIGURE 2) and the arm 72 secured thereon. A tension spring 74 is secured at one end to bracket 62 and at the other end to clevis 70, and encircles the portion of cable 66 therebetween.

Figure 2:
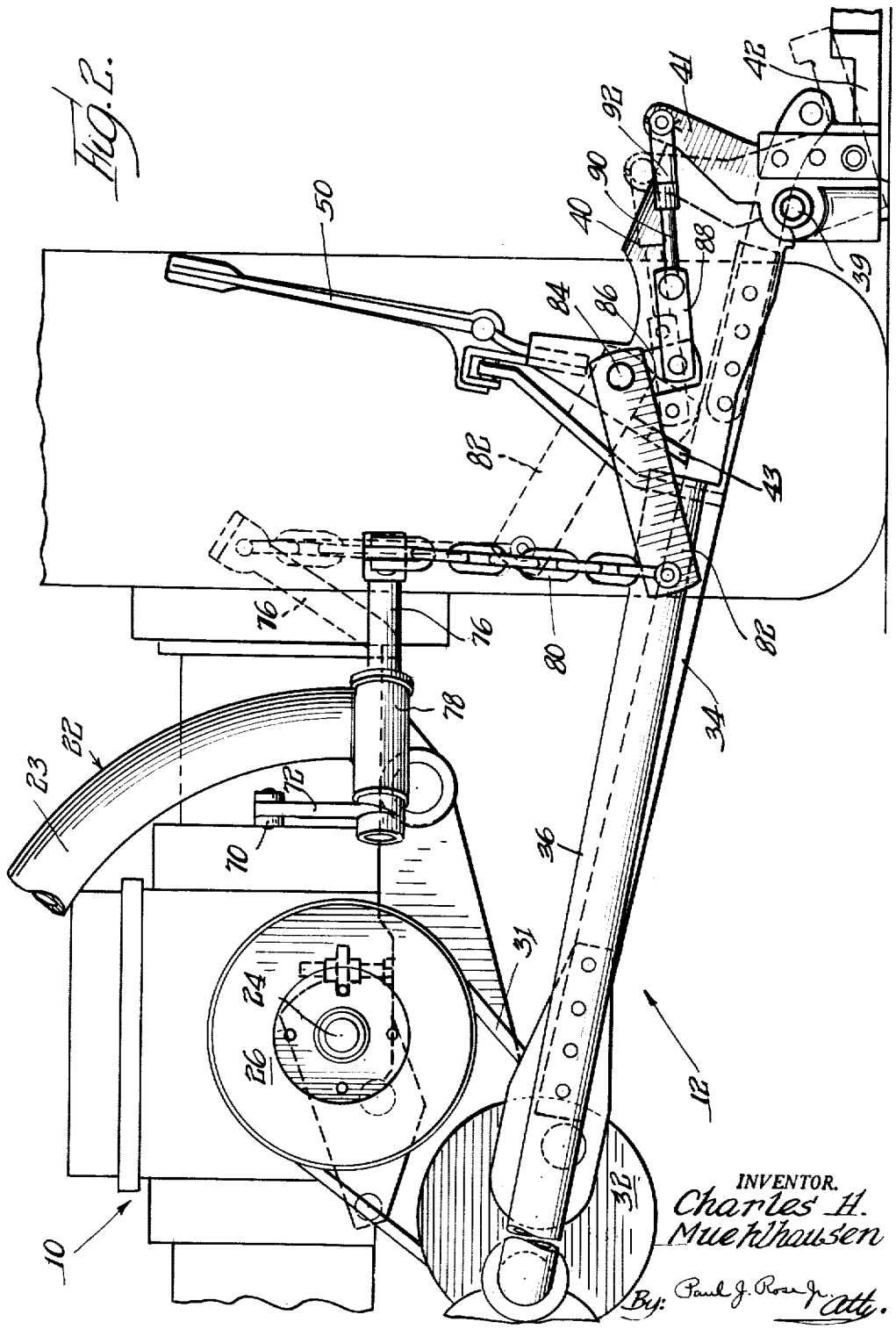
FIGURE 2 is a fragmentary rear elevational view showing a portion of the tractor and mower, and particularly showing a portion of the linkages of the lift mechanism, normal operating position being shown in full lines and raised position in dotted lines.

The remainder of the lift mechanism can be seen in FIGURES 1 and 2. A chain 80 is connected at one end to arm 76 of the bell crank lever and at the other end to arm 82 of a second bell crank lever pivoted at 84 on yoke 40. The other arm 86 of the second bell crank lever is pivotally connected to a link 88, which is pivotally connected at its other end to the eye end of a threaded connecting member 90. The connecting member 90 is threaded to a clevis 92 which is pivotally connected to an upstanding ear 41 of shoe 42. The yoke 40 is provided with a stud on each side, including stud 39 in FIGURE 2, for the pivotal mounting of shoe 42 thereon. In addition, yoke 40 is provided with an integral stop 43 engageable by arm 86.

The tension spring 74 does not actually function as a part of the lift mechanism, but it does partially offset the weight of the cutter bar 44 to reduce the drag as the cutter bar moves along the ground.

Figure 3:
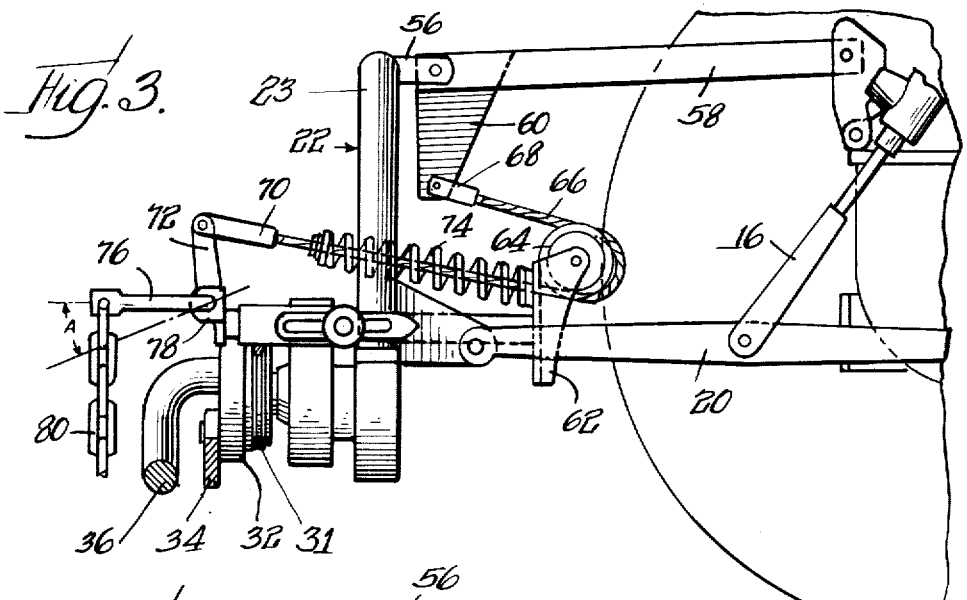

FIGURE 3 shows the normal position of a portion of the lift mechanism when the cutter bar 44 is in engagement with level ground. It will be noted that there is slack in cable 66. This is to enable cutter bar 44 and sickle 48 to mow banks along roads, etc., and angle A represents the angle through which arm 76 can rotate, to lower the outer end of the cutter bar down over banks, before the slack in cable 66 is taken up.

Figure 4:
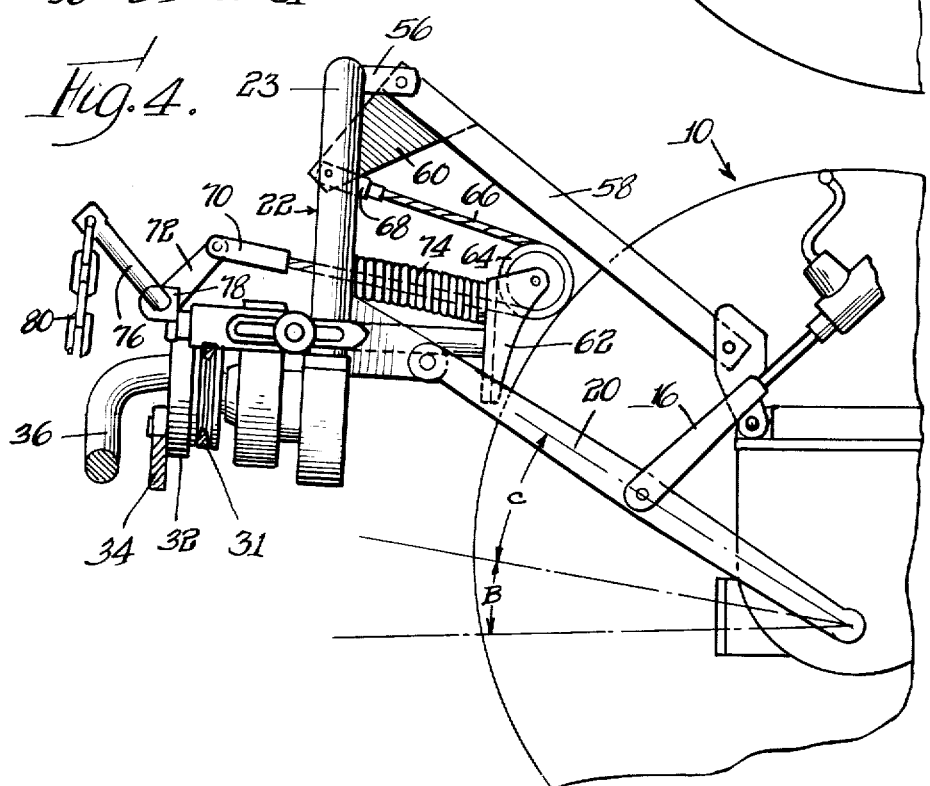
FIGURE 4 is a view similar to FIGURE 3 showing the same portion of the linkages of the lift mechanism in raised position.

FIGURE 4 shows the fully raised position of the portion of the lift mechanism shown in FIGURE 3. As draft links 18 and 20 are raised by the power operated lift links 14 and 16, upper link 58 is raised through a comparable arc and arm 60 thereon is moved away from pulley 64. By the time draft links 18 and 20 have been raised through angle B, the slack in cable 66 has been taken up. During the time that draft links 18 and 20 are raised through angle B, frame structure 22 is raised, but drag bar 36 and stabilizing rod 54 pivot downward and cutter bar 44 remains on the ground. After draft links 18 and 20 have been raised through angle B and the slack has been taken up in cable 66, upon further raising of draft links 18 and 20, frame structure 22 will be raised and drag bar 36 and rod 54 will continue to pivot downward, but only shoe 42 will remain on the ground. Shoe 42 will pivot to the dotted line position shown in FIGURE 2, and will raise cutter bar 44 off the ground, pivoting the cutter end thereof upward. After arm 86 engages stop 43 on yoke 40, further raising of draft links 18 and 20 through the remainder of angle C will raise the entire mower from the ground as a unit.

It will be seen that I have provided an improved lift mechanism for pivoting the cutter bar in addition to raising the mower as a unit when the draft links are raised. Variations and modifications may be made without departing from the spirit and scope of the invention.

I claim:

1. For use with a tractor having a pair of laterally spaced, power lifted, trailing lower draft links mounted for pivotal lifting and lowering movement, a mowing implement comprising a frame adapted to be pivotally connected to the free ends of said draft links, an upper link pivotally connected at one end to said frame and adapted to be pivotally connected at the other end to said tractor, a transverse drag bar pivotally mounted on said frame, a yoke mounted on the free end of said transverse drag bar, a shoe pivotally mounted on said yoke, a cutter bar adapted to support a sickle for reciprocal movement therealong, said cutter bar extending transversely from said shoe and having an end secured to said shoe for pivotal movement therewith, a pulley mounted for turning about an axis parallel to the rear axle of said tractor, said pulley being supported by said frame between the ends of said upper link in a direction longitudinally of said tractor and being off-set transversely of said tractor so as to be closer to one of said lower draft links than to the other, a cable actuating arm depending from said upper link adjacent the end thereof which is pivotally connected to said frame, said arm extending transversely of said tractor toward said pulley and adapted to have the free end thereof swing in an arcuate path away from said pulley when said draft links are pivoted upwardly to raise said frame, and non-extensible motion-transmitting means operably connected between said shoe and said cable actuating arm for pivoting said shoe upwardly when said draft links are pivoted upwardly whereby to provide additional clearance for said cutter bar, said non-extensible motion-transmitting means including first and second bell crank levers pivotally mounted on said yoke and said frame, respectively, means connecting one arm of said first bell crank lever to said shoe, means connecting the other arm of said first bell crank lever to one arm of said second bell crank lever, and a cable extending around said pulley and having one end connected to the other arm of said second bell crank lever and its opposite end connected to said cable actuating arm, whereby swinging movement of the free end of said cable actuating arm exerts a positive pulling force on one end of said cable when said frame is lifted by said draft links.

2. For use with a tractor having a pair of laterally spaced, power lifted, trailing lower draft links mounted for pivotal lifting and lowering movement, a mowing implement comprising a frame adapted to be pivotally connected to the free ends of said draft links, an upper link pivotally connected at one end to said frame and adapted to be pivotally connected at the other end to said tractor, a transverse drag bar pivotally mounted on said frame, a yoke mounted on the free end of said transverse drag bar, a shoe pivotally mounted on said yoke, a cutter adapted to support a sickle for reciprocal movement therealong, said cutter bar extending transversely from said shoe and having an end secured to said shoe for pivotal movement therewith, and non-extensible means operatively connecting said upper link and said shoe in a manner whereby said shoe is pivoted upwardly as said draft links are lifted to provide additional clearance of said cutter bar over objects encountered in a field, said means including a pulley mounted for turning about an axis parallel to the rear axle of said tractor, said pulley being supported by said frame between the ends of said upper link in a direction longitudinally of said tractor and being off-set transversely of said tractor so as to be closer to one of said lower draft links than to the other, a cable actuating arm depending from said upper link adjacent the end thereof which is pivotally connected to said frame, said arm extending transversely of said tractor towards said pulley and adapted to have the free end thereof swing in an arcuate path away from said pulley when said draft links are pivoted upwardly to raise said frame, a first bell crank lever pivotally mounted on said frame at a fixed distance from said pulley, a cable operatively associated with said pulley and connected at one end to the free end of said cable actuating arm and at the other end to one arm of said first bell crank lever, a second bell crank lever mounted on said yoke, means connecting the other arm of said first bell crank lever and one arm of said second bell crank lever, and means connecting the other arm of said second bell crank lever and said shoe, whereby when the free end of said cable actuating arm is swung in an arcuate path away from said pulley upon upward pivoting movement of said draft links a positive pulling force is exerted on said cable for pivoting said first bell crank lever and thus said second bell crank lever and said shoe in a manner to pivot said cutter bar upwardly.

3. For use with a tractor having a pair of laterally spaced, power lifted, trailing lower draft links mounted for pivotal lifting and lowering movement, a mowing implement comprising a frame adapted to be pivotally connected to the free ends of said draft links, an upper link pivotally connected at one end to said frame and adapted to be pivotally connected at the other end to said tractor, a transverse drag bar pivotally mounted on said frame, a yoke mounted on the free end of said transverse drag bar, a shoe pivotally mounted on said yoke, a cutter bar adapted to support a sickle for reciprocal movement therealong, said cutter bar extending transversely from said shoe and having an end secured to said shoe for pivotal movement therewith, and non-extensive means operatively connecting said upper link and said shoe in a manner whereby said shoe is pivoted upwardly as said draft links are lifted to provide additional clearance of said cutter over objects encountered in a field, said means including a pulley for turning about an axis parallel to the rear axle of said tractor, said pulley being supported in a seat on said frame between the ends of said upper link in a direction longitudinally of said tractor and being off-set transversely of said tractor so as to be closer to one of said lower draft links than to the other, a cable actuating arm depending from said upper link adjacent the end thereof which is pivotally connected to said frame, said cable actuating arm extending transversely of said tractor toward said pulley and adapted to have the free end thereof swing in an arcuate path away from said pulley when said draft links are pivoted upwardly to raise said frame, a first bell crank lever pivotally mounted on said frame at a fixed distance from said pulley, a cable operatively associated with said pulley and connected at one end to the free end of said cable actuating arm and at the other end to one arm of said first bell crank lever, a coil spring encircling said cable along the length thereof between said one end of said first bell crank lever and said pulley seat, said coil spring having each of its ends attached to said one end of said first bell crank lever and said pulley seat, respectively, a second bell crank lever mounted on said yoke, means connecting the other arm of said first bell crank lever and one arm of said second bell crank lever, and means connecting the other arm of said bell crank lever and said shoe, whereby said spring restrains downward pivoting movement of said cutter bar but permits said cable actuating arm to exert a positive pulling force on one end of said cable when said frame is lifted by said draft links.

References Cited in the file of this patent

UNITED STATES PATENTS

| | | |
|---|---|---|
| 2,477,687 | Coultas | Aug. 2, 1949 |
| 2,673,437 | Pollock et al. | Mar. 30, 1954 |
| 2,867,959 | Peak | Jan. 13, 1959 |

FOREIGN PATENTS

| | | |
|---|---|---|
| 77,470 | Denmark | Apr. 12, 1954 |

UNITED STATES PATENT OFFICE
CERTIFICATE OF CORRECTION

Patent No. 3,086,345　　　　　　　　　　　　　April 23, 1963

Charles H. Muehlhausen

It is hereby certified that error appears in the above numbered patent requiring correction and that the said Letters Patent should read as corrected below.

Column 1, line 37, for "FIGURE 1" read -- FIGURE 3 --; column 2, line 13, for "at" read -- to --; column 3, line 22, for "cutter" read -- outer --.

Signed and sealed this 12th day of November 1963.

(SEAL)
Attest:
ERNEST W. SWIDER　　　　　　　　　　　　　　　EDWIN L. REYNOLDS

Attesting Officer　　　　　　　　　　　　　　Acting Commissioner of Patents